Patented May 26, 1936

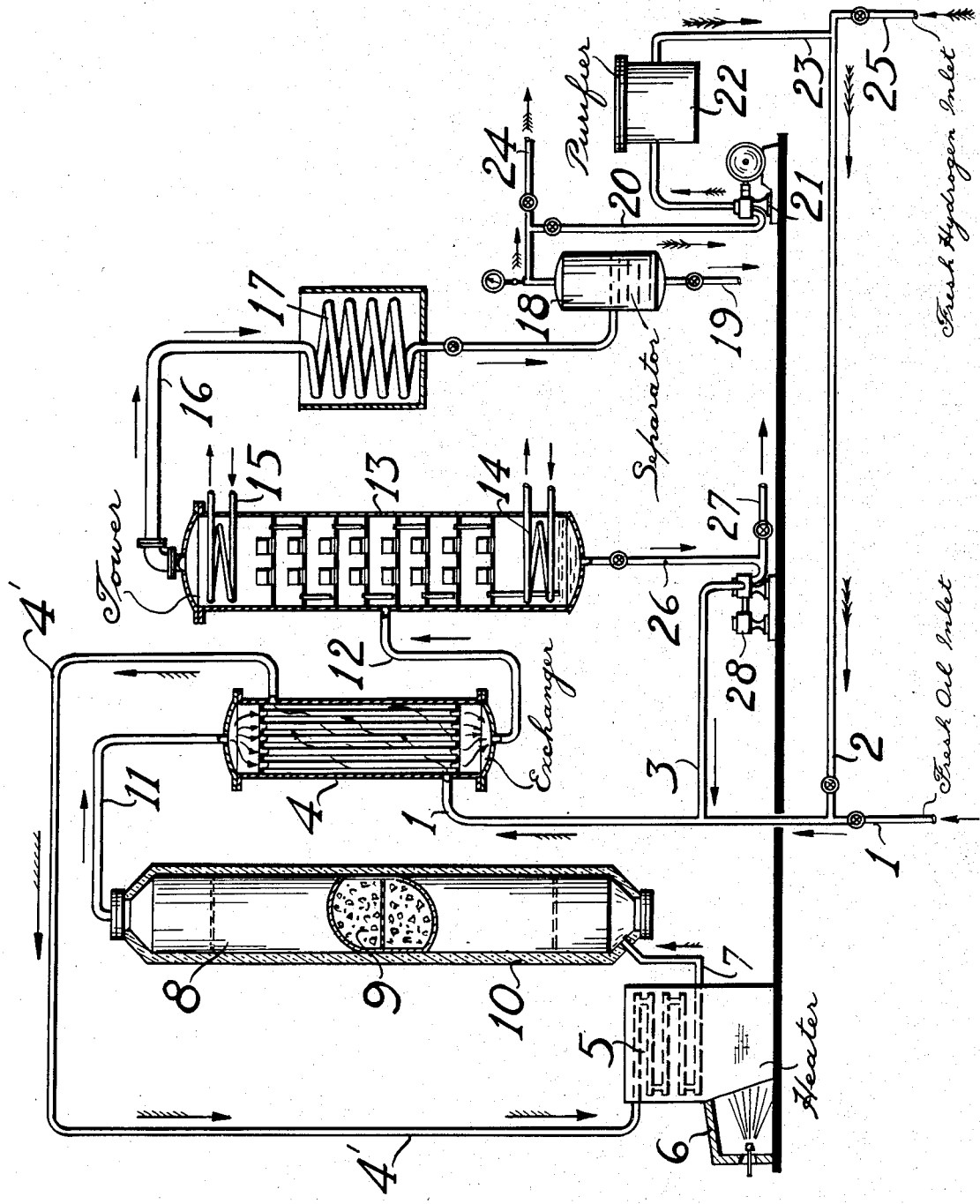

2,042,306

UNITED STATES PATENT OFFICE 2,042,306

PROCESS FOR THE MANUFACTURE OF HIGHLY UNSATURATED OR AROMATIC DISTILLATES FROM HEAVIER OILS

Robert T. Haslam, Westfield, N. J., assignor to Standard-I. G. Company, a corporation of Delaware Application May 31, 1930, Serial No. 458,918

15 Claims. (Cl. 196—53)

The present invention relates to an improved method for producing high grade motor fuels from heavier oils by the action of high pressure hydrogen at elevated temperatures under the influence of certain catalysts. My process will be fully understood from the following description.

In a previous application Ser. No. 372,294 filed June 20, 1929, a process for producing highly unsaturated or aromatic hydrocarbons from heavier products by hydrogenation has been disclosed, and it has been found possible to operate with considerably less hydrogen than has formerly been supposed to be requisite for the process. I have discovered that a similar operation when carried out in the presence of certain catalytic materials, which will be disclosed below, uses even, less hydrogen than I had previously supposed and that similar or analogous highly aromatic or unsaturated liquid products are produced which serve admirably as motor fuels in high compression engines. These fuels possess the power of suppressing knocking to a high degree.

The drawing is a diagrammatic sketch in sectional elevation of one type of apparatus suitable for my process. A hydrocarbon distillate oil such as gas oil or kerosene and having a final boiling point preferably below about 700 to 750° F., is supplied under suitable pressure through line 1 from an outside source. This oil is mixed with hydrogen from line 2 and if desired with recycled oils. The mixture of gas and oil is passed through heat exchanger 4 and line 4' to coil 5 in furnace 6 where it is heated to a temperature of about 800 to 900° F., depending upon the temperature desired in the catalytic reactor. The heated mixture is passed from the coil through line 7 into reaction vessel 8 which is suitably designed to withstand corrosive effect of the reactants at the temperatures and pressures used. Pressure is maintained in this reactor preferably above 50 atmospheres and may be 200 atmospheres or higher. The reaction vessel contains catalytic material 9 which may be packed in the vessel in lump form or supported on trays. A coating of suitable insulating material 10 is placed around the reactor which is preferably maintained at the desired temperature by the heat of the incoming material and the exothermic heat of reaction. Additional means such as electrical resistance heaters may be used if desired. The reaction products are passed through line 11, heat exchanger 4 and line 12 into a fractionating tower 13 which in this example is operated substantially at system pressure, although lower pressures may be used if desired. The tower is supplied with suitable means for stripping and providing reflux such as heating coil 14 and cooling coil 15 respectively. This tower is preferably operated so that the vaporized hydrocarbons in the overhead have a final boiling point corresponding to that of gasoline. These vaporized hydrocarbons are withdrawn with the hydrogen and fixed gas through line 16 and cooler 17 to separator vessel 18. The liquefied hydrocarbons are withdrawn from this vessel through line 19 to storage, not shown. The uncondensed gases may be withdrawn through line 20 and may be recycled in the destructive hydrogenation process by compressor 21. The gases are then passed through a purifier 22 in which they are scrubbed with gas oil and/or caustic soda or other suitable absorbents for hydrocarbons and sulphur compounds. The purified hydrogen is passed through line 23 to line 2 in admixture with additional fresh hydrogen supplied to line 25. As my process involves considerable dehydrogenation the uncondensed gas leaving separator vessel 18 may contain more hydrogen than is required for the operation and a part or all of this gas may be removed from the system through line 24.

The liquefied hydrocarbons having a higher boiling range than gasoline are withdrawn from tower 13 through line 26 and may be removed from the system through line 27. However these hydrocarbons are preferably returned to the system without cooling by hot oil pump 28 and line 3 and may be completely converted into gasoline and lighter hydrocarbons.

In the operation of the present process, oils principally distillates such as gas oil, kerosene, heavy naphtha and the like, and preferably low grade stocks, such as refractory materials obtained from cracking operations, are forced with hydrogen through a heated coil whereby the temperature of the mixture is raised to about 800 to 850° F. The heated mixture is then discharged into and through the catalytic reaction zone packed with a particular catalyst which will be specifically disclosed below. The temperature of the catalytic zone is maintained at 930 or above and is preferably from 950 to 1050° F. It has been found that no heat need be added to the zone other than that which is carried in with the feed and that the heat of the reaction is sufficient to raise the feed materials to the reaction temperature. It has been found desirable, notably when working in the upper end of the temperature range to line or construct the reaction vessel of steel alloys containing more than 15 to 20% chromium and nickel in excess of 6 to 10%. The carbon content of the alloy should be below about 0.50% for the best results. For example, an alloy of the following composition has been found satisfactory, 27% chromium, 22% nickel, 2% silicon and 0.2% carbon. The tubes of the heating coil may also be preferably constructed of this material.

The heating coil and reaction zone are maintained under high pressure, the total pressure being in excess of 50 atmospheres and preferably from 150 to 300 atmospheres, although it may be higher. Hydrogen pressure is most advantageous between the limits of 3 to 5 times the oil pressure, which ordinarily should not exceed about 75 atmospheres and is preferably from 40 to 60 atmospheres for best results when the maximum total pressure does not exceed 300 atmospheres. When this is in excess of 300 atmospheres the oil partial pressure may be proportioned accordingly. The rate of flow of the oil is preferably in excess of 1 volume per volume of reactor space per hour and the most desirable range is in excess of 2 volumes per volume per hour. It may be understood that the amount of hydrogen circulated is sufficient to maintain partial pressure conditions as indicated above.

As catalysts I use compounds of negative elements of the sixth group of the periodic system, such as sulfur, selenium, tellurium and preferably the sulfides, selenides and tellurides of heavy metals such as those of the sixth group of the periodic system, namely molybdenum, chromium and tungsten. These materials may be used either alone or in mixtures with each other or with other compounds such as the oxides of the alkaline earth group, alumina and the rare earths. The catalysts are preferably prepared in the form of sulfides or equivalent compounds, but in some cases it is desirable to form oxides and to treat such oxides with substances containing sulfur, selenium, tellurium and capable of converting such oxides either partially or completely into the sulfides or the like. For example, oxides may be treated before operation or during an early stage of operation with carbon disulfide or similar materials to cause a partial or total conversion of oxide to sulfide. These catalysts may be made up in paste and allowed to dry into cubes or other shapes or they may be supported on convenient carrying materials particularly those capable of readily conducting away heat. For this purpose shavings or turnings of copper, nickel or high chromium and nickel alloys as previously described are particularly desirable, since they also exert catalytic influence in addition to their heat dissipating capacity. Other metallic substances possessing no detrimental catalytic influence may also be employed. Catalysts other than those mentioned above may be used such as copper sulfide, copper selenide and telluride, and similar salts of nickel, cobalt, iron, zinc, silver, cadmium and the like, although as indicated above the sulfides, selenides and tellurides of metals of the sixth group are preferred. It will be understood that these are also preferably disposed on carriers of high heat conductivity.

I have found that when operating in the manner as disclosed above, extremely high yields of material boiling below 400° F. can be produced from distillate oils of higher boiling range. The low boiling hydrofined oils contain large quantities of unsaturated hydrocarbons and aromatics and are admirably adapted for use in high compression internal combustion engines. When operating for a definite yield, say a maximum yield of gasoline, the naphtha produced is more unsaturated than ordinarily obtained, while the gas loss is about the same. I have found that the consumption of hydrogen is considerably less than has heretofore been thought possible and in fact much less than is ordinarily required to prevent carbon deposition or tar formation. In operating on a gas oil distillate it is possible to produce over 75 or 85% of oil boiling below 400° F. and to consume less than 1200 or even 1000 cubic feet of hydrogen per barrel of oil fed. It is generally desirable to separate the products obtained from the hydrogenation reactor into fractions boiling below 400° F. or 430° F. suitable for motor fuel, and fractions boiling thereabove. This latter fraction is preferably recirculated through the coil and reactor to increase the yield of low boiling products. In this manner the entire feed oil may be converted to gasoline and fixed gases. Such operation is desirable since it produces better anti-detonation characteristics in the naphtha than are obtained when the heavy feed is not totally converted. As has been indicated above, there is no tar or carbon formation and the gas loss is almost always below 25% of the feed and may be less than 15% depending on the character of the original stock and the catalysts and pressure conditions used. I have observed that where the feed oil has relatively lower aniline point the naphtha is of better quality. A relationship exists between aniline miscibility of the oil and the anti-knock rating of the light motor fuel derived therefrom.

As an example, when a gas oil having a gravity of 28.8° A. P. I. and an aniline miscibility point of 161° F. is treated at a total pressure of 200 atmospheres and oil pressure of 40 atmospheres temperature above 950° F. and catalysts such as I have disclosed above, about 75.7% of hydrofined naphtha having a final boiling point of 428° F. is produced. The distillate fraction boiling below 400° F. has an anti-knock rating equivalent to a sweet uncracked gasoline to which 30% of pure benzol has been added. When, however, a cracked gas oil having an aniline miscibility point of 120° F. is used under substantially the same conditions, a yield of over 85% of hydrofined gasoline having an end point of 426° F. is produced having a knock rating equivalent to sweet uncracked gasoline to which over 50% of pure benzol is added. The distillates produced by my process are normally water white or may have a slight yellow tinge, having gravity from 45 to about 55° A. P. I. Sulfur content is greatly reduced below that of the feed. The hydrofined oil is stable to light and contains only small quantities of gum insufficient to cause any difficulty in the operation of internal combustion engines. The oil may be advantageously blended with other motor fuels, if desired. Hydrogen consumption is less than 1000 or 1100 cubic feet per barrel of oil fed and the loss of carbon in the form of methane and other permanent gases is below 25% of the feed in both cases.

My invention is not to be limited by any theory of the mechanism of the reactions nor to any specific example which may have been given for purpose of illustration, but only by the following claims in which I wish to claim all novelty inherent in my invention.

I claim:

1. An improved process for obtaining valuable unsaturated hydrocarbons useful for motor fuel, which comprises subjecting heavier refractory distillates with boiling point ranges up to and through the range of gas oil in a reaction zone in vapor phase to the action of free hydrogen at a temperature above 930° F. and under total pressure in excess of 50 atmospheres in the presence of a catalyst comprising a compound of a solid negative element of Group VI with a heavy metal of Group VI of the periodic system, maintaining the partial pressure of hydrogen about three to five times the partial pressure of the oil, and passing the oil through the reaction zone at a rate in excess of one volume of oil per volume of reaction space per hour.

2. Process according to claim 1 in which the oil is passed through the reaction zone at a rate in excess of two volumes of oil per volume of reaction space per hour.

3. Process according to claim 1 in which the catalyst comprises a compound selected from the class including the sulfides, selenides and tellurides of heavy metals of the VI group of the periodic system.

4. Process according to claim 1 in which the products heavier than motor fuel are separated and continuously re-cycled through the reaction zone until substantially completely converted into motor fuel fractions and gas.

5. Process according to claim 1 in which the total pressure is within the limits of 150 to 300 atmospheres.

6. Process according to claim 1 in which the oil fractions of the product boiling above 400° F. are recirculated through the reaction chamber.

7. Process for the production of improved motor fuels comprising subjecting relatively heavier petroleum distillate fractions having boiling point ranges up to and through the range of gas oil to destructive hydrogenation at a temperature between 950 and 1050° F. in vapor phase at a pressure in excess of 20 atmospheres in the presence of a catalyst comprising a compound of a solid negative element of Group VI with a heavy metal of Group VI of the periodic system, for a time such that substantial quantities of lower boiling hydrocarbons are formed, maintaining the partial pressure of hydrogen about three to five times the partial pressure of the oil whereby unsaturated products having marked anti-detonating characteristics when used as motor fuels are obtained.

8. Process according to claim 7 in which the catalyst comprises molybdenum sulfide.

9. Process according to claim 7 in which the catalyst comprises tungsten sulfide.

10. Process for preparing improved petroleum products which comprises subjecting a heavier petroleum distillate oil, having a boiling point range up to and through the range of gas oil and which requires dehydrogenation to produce anti-knock fuels, to destructive hydrogenation in a continuous process in which said oil is passed, through a reaction zone containing as catalyst a compound of a solid negative element of Group VI except sulphur with a heavy metal of group 6 of the periodic system and maintained at a temperature above about 930° F. in the upper portion of the range suitable for destructive hydrogenation and at a pressure above about 20 atmospheres, maintaining the partial pressure of hydrogen about three to five times the partial pressure of the oil said oil being passed through said reaction zone at a rate in excess of one volume of oil per volume of reaction space per hour adjusted to permit a substantial conversion of the initial material into products of lower boiling range, whereby unsaturated products having marked anti-knocking characteristics when used as motor fuel are obtained.

11. An improved process for obtaining valuable unsaturated hydrocarbons useful for motor fuel, which comprises passing a heavier petroleum distillate oil having a boiling point range up to and through the range of gas oil and which requires dehydrogenation to produce anti-knock motor fuel, in vapor phase with free hydrogen through a reaction zone maintained at a temperature above 930° F. in the upper portion of the range suitable for destructive hydrogenation and under a total pressure in excess of 50 atmospheres and containing a catalyst comprising a compound of a solid negative element of group 6 except sulphur with a heavy metal of group 6 of the periodic system, maintaining the partial pressure of hydrogen about three to five times the partial pressure of the oil and passing the oil through the reaction zone at a rate in excess of one volume of oil per volume of reaction space per hour adjusted to permit a substantial conversion of the initial material into products of lower boiling range, whereby unsaturated products having marked anti-knocking characteristics when used as motor fuel are obtained.

12. Process according to claim 11 in which the oil is passed through the reaction zone at a rate in excess of two volumes of oil per volume of reaction space per hour.

13. Process according to claim 11 in which the catalyst comprises a compound selected from the class consisting of the selenides and tellurides of chromium, molybdenum and tungsten.

14. Process according to claim 11 in which the products heavier than motor fuel are separated and continuously recycled through the reaction zone until substantially completely converted into motor fuel fractions and gas.

15. Process according to claim 11 in which the total pressure is within the limits of 150 to 300 atmospheres.

ROBERT T. HASLAM.